(12) United States Patent
Connor et al.

(10) Patent No.: US 6,999,560 B1
(45) Date of Patent: Feb. 14, 2006

(54) METHOD AND APPARATUS FOR TESTING ECHO CANCELLER PERFORMANCE

(75) Inventors: Kevin J. Connor, Sunnyvale, CA (US); Michael E. Knappe, San Jose, CA (US); Ramanathan T. Jagadeesan, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/340,987

(22) Filed: Jun. 28, 1999

(51) Int. Cl.
*H04M 1/24* (2006.01)
*H04M 3/08* (2006.01)
*H04M 3/22* (2006.01)

(52) U.S. Cl. .................. 379/3; 379/406.01; 379/392

(58) Field of Classification Search .............. 379/1.01, 379/3, 406.01, 406.16, 388.01, 392.01
See application file for complete search history.

(56) References Cited

U.S. PATENT DOCUMENTS

| | | | |
|---|---|---|---|
| 3,637,954 A | 1/1972 | Anderson et al. ... | 179/175.31 E |
| 4,363,122 A * | 12/1982 | Black et al. ............... | 370/435 |
| 4,449,231 A * | 5/1984 | Chytil | |
| 4,727,566 A | 2/1988 | Dahlqvist ................... | 379/410 |
| 4,918,685 A | 4/1990 | Tol et al. ..................... | 370/13 |
| 5,008,923 A | 4/1991 | Kitamura et al. ........... | 379/407 |
| 5,303,228 A | 4/1994 | Tzeng ......................... | 375/118 |
| 5,600,718 A | 2/1997 | Dent et al. .................. | 379/410 |
| 5,621,854 A | 4/1997 | Hollier ....................... | 395/2.42 |
| 5,633,936 A * | 5/1997 | Oh | |
| 5,680,450 A | 10/1997 | Dent et al. .................. | 379/410 |
| 5,867,574 A * | 2/1999 | Eryilmaz ................ | 379/388.04 |
| 6,122,531 A * | 9/2000 | Nicholls et al. ............. | 455/570 |
| 6,275,794 B1 * | 8/2001 | Benyassine et al. ........ | 704/207 |
| 6,282,176 B1 * | 8/2001 | Hemkumar | |

* cited by examiner

*Primary Examiner*—Duc Nguyen
(74) *Attorney, Agent, or Firm*—Marger Johnson & McCollom, PC (57) ABSTRACT

A test system measures performance of telephone network echo cancellers using a primary criterion of estimated user annoyance due to audible returned echo. The invention generates live telephone calls, uses real speech samples as stimulus signals and provides tail-circuit emulation using actual measured telephone tail-circuit impulse responses. These features provide better 'real-life' test conditions for the echo canceller system under test than current ITU standard test methods. Two methods are employed for echo canceller performance evaluation via metrics of estimated user annoyance due to echo. Energy-based method employs point-by-point comparison of talker speech and talker echo signal energy envelopes and uses variable energy thresholds for estimation of echo audibility. A perceptual-model based method uses a Perceptual Speech Distortion Metric (PSDM), such as ITU P.861, in an unique configuration to estimate user annoyance due to audible echo. Echo canceller performance is tested under both single-talk and double-talk conditions. Innovative application of the PSDM method in double-talk tests allow estimation of quality of received double-talk speech.

50 Claims, 7 Drawing Sheets

FIG.9

METHOD AND APPARATUS FOR TESTING ECHO CANCELLER PERFORMANCE

BACKGROUND OF THE INVENTION

The invention relates generally to a system for testing performance of a telephone network echo canceller and more specifically to a test system that rates echo canceller performance according to user perceptual annoyance.

Figure 1:
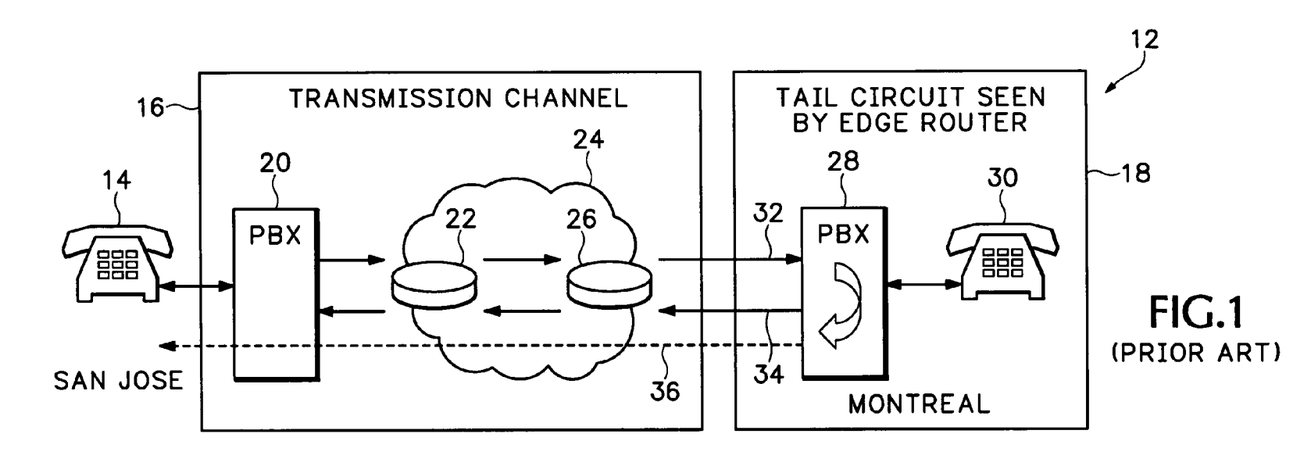
FIG. 1 is a prior art diagram of a telephone network.

FIG. 1 is a schematic of a packet-based telephone system 12. A telephone 14 is coupled through a transmission channel 16 to a tail circuit 18. The transmission channel 16 includes a Public Branch Exchange (PBX) 20 that couples the telephone 14 to a voice packet gateway 22 in a packet-switched network 24. Another voice packet gateway 26 at another location in the packet-switched network 24 is connected through a PBX 28 to a telephone 30 in the tail circuit 18.

The telephone 14 is in a first location, such as San Jose, and the telephone 30 is in a second location, such as Montreal. A user of telephone 14 in San Jose may experience an echo problem when connected to the telephone 30 in Montreal. The echo problem is typically created when the tail circuit 30 in Montreal allows some of the audio signal from a transmission audio path 32 to leak through into the audio signal on a return audio path 34. The leaking audio signal in the return audio path 34 is represented by a dotted line 36 and is perceived as echo at the San Jose telephone 14.

The tail circuit 18 represents the electrical equipment, such as Public Branch Exchange's (PBX's), telephones, microphones, transformers, etc., at the far end of the phone call to the right of the gateway 26. The tail circuit 18 shown in FIG. 1 includes any equipment in Montreal that creates the echo signal 36.

Figure 2:
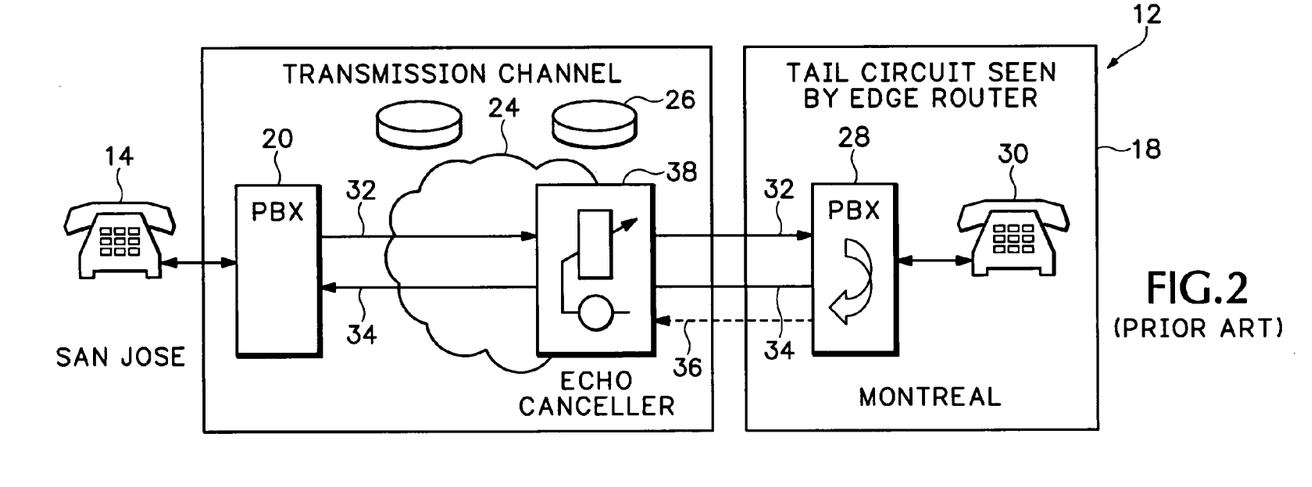
FIG. 2 is a prior art diagram of the telephone network of FIG. 1 including an echo canceller.

Referring to FIG. 2, the standard solution for removing echo is to use an echo canceller 38. In the case of the network shown in FIG. 2, the echo canceller 38 runs on the packet voice gateway 26 on the Montreal edge of the tail circuit 18. The packet voice gateway 26 converts audio signals from the PBX 28 into voice packets for sending over the packet switched network 24. In the other direction, the gateway 26 converts voice packets back into audio signals for sending to PBX 28. Echo cancellers are used in both traditional circuit switched networks, such as used in tail circuit 18, and packet switched networks, such as network 24.

The echo canceller 38 is typically a four-terminal device containing an adaptive Finite Impulse Response (FIR) filter. The FIR filter starts with zero knowledge about the system it is connected to, in this case the tail circuit 18. By listening to the transmitted speech signal 32 and the echo signal 36 returning from the tail circuit 18, the adaptive filter in echo canceller 38 dynamically modifies filter coefficients to rapidly form an internal, functional model of the tail circuit 18.

Using this internal 'recipe', the echo canceller 38 produces a sample by sample estimate of the echo signal 36. This estimated echo signal is subtracted from the real echo signal 36. As the internal model in the echo canceller 38 improves over time in converging on the echo signal 36, attenuation of the echo signal 36 increases. As a result, the echo canceller 38 attenuates the echo signal 36 that normally returns to the phone 14 in San Jose while allowing the audio signal 34 from a talker at phone 30 to pass through.

Figure 3:
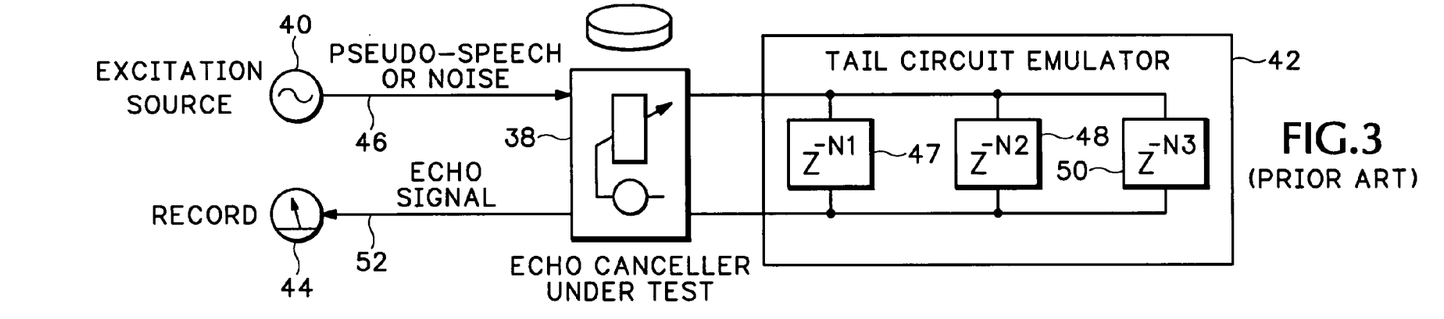
FIG. 3 is diagram showing a prior art system for testing an echo canceller.

FIG. 3. represents a traditional echo canceller performance testbed, as described in International Telecommunications Union ITU-T specifications G.165 and G.168. The echo canceller 38 has four audio terminals. A prerecorded speech or noise signal 46 is input to the echo canceller 38 under test. ITU specification G.165 specifies inputting a white noise excitation signal 46 and ITU specification G.168 employs a pseudo-speech signal 46.

A tail circuit emulator 42 includes a set of parallel audio delay lines 47, 48 and 50 that provide a simple three-reflector model of three different echo delays and associated echo amplitudes. Echo of the speech or noise signal 46 is generated by the tail circuit emulator 42 and fed back into the echo canceller 38. The level of the returning echo signal 52 allowed to pass through the echo canceller 38 is recorded by an audio recorder 44.

In both ITU specifications, the performance of the echo canceller 38 is rated on a purely objective standard. The performance of the echo canceller 38 is rated based on the convergence time required to attenuate the echo signal 52 to a predefined threshold, i.e., the time required to alternate the echo signal to a certain level. In other words, the less echo signal received by the recorder 44, the better the rated performance of the echo canceller 38. A problem exists when using the G.165 and G.168 standards for measuring echo canceller performance. The white noise or pseudo-speech signals 46 input into the echo canceller 38 do not accurately reflect 'real-world' audio signals that are normally produced by a telephone user. The performance of the echo canceller 38 is generally poorer when the excitation signal is real human speech. This is because the spectral content of human speech is 'poor' compared to the 'richness' of white noise test signals.

Also, a simple three-reflector model is not necessarily a good model for emulating actual tail circuit impulse responses. For example, the tail circuit 18 shown in FIG. 2 may have many more than three different echo delay times all with varying amplitudes. The echo canceller 38 may not be effective in canceling some of these other echo characteristics. Further, some echo characteristics may be very annoying to a phone user and other echo characteristics may have little or no annoyance to the user. Simply measuring objective results, such as white-noise convergence time, does not effectively identify perceived echo annoyance to a user.

Accordingly a need remains for more effectively testing echo canceller performance.

SUMMARY OF THE INVENTION

A test system according to the invention measures Perceptual Annoyance Caused by Echo (PACE). Live telephone calls are generated and real speech signals used to test echo canceller performance. A sophisticated tail circuit emulator, and a novel perceptual annoyance processing technique uses the real speech signals and returned echo signals to automatically determine the perceived annoyance of echo on a user.

Echo is perceived by a user when the energy level of the echo signal exceeds some energy threshold. However, the echo energy threshold changes depending upon the energy level of any active voice signals. In other words, if one or more phone users are talking at the same time the echo signal arrives at the user phone, some or all of the echo signal may be masked out by the voice signals.

The invention uses a first speech echo perception threshold when the received echo signals occur during speech episodes and uses a second silence echo perception threshold when echo signals occur during silent episodes in the speech signal. This allows the test system to more accurately determine when echo is perceived by a user and more accurately determine the level of annoyance perceived echo has on the user.

The test system compares point by point a speech energy level trace with an echo energy level trace to generate different metrics. The different metrics are generated using the different perception thresholds to rate the performance of the echo canceller. A key innovation of the invention is the use of a Perceptual Speech Distortion Metric (PSDM) for speech, such as, but not limited to, ITU standard P.861 (PSQM). The PSDM is employed to estimate the annoyance level a user would experience for a given echo signal. Performance of the echo canceller is tested for both a single audio source condition and in a double talk condition where audio signals are sent to both ends of a phone conversation at the same time.

A Finite Impulse Response (FIR) filter is used to more accurately emulate tail circuits from one or more different locations. A library of coefficients are used with the FIR filter to emulate echo signals associated with different tail circuit locations. The different coefficients test the echo canceller in a more 'real world' environment. The echo signals for different tail circuit locations are emulated according to received speech or audio signals and sent to the echo canceller. The perceptual echo annoyance is then determined for any echo signal allowed to pass through the echo canceller.

The foregoing and other objects, features and advantages of the invention will become more readily apparent from the following detailed description of a preferred embodiment of the invention which proceeds with reference to the accompanying drawings.

DETAILED DESCRIPTION

Figure 4:
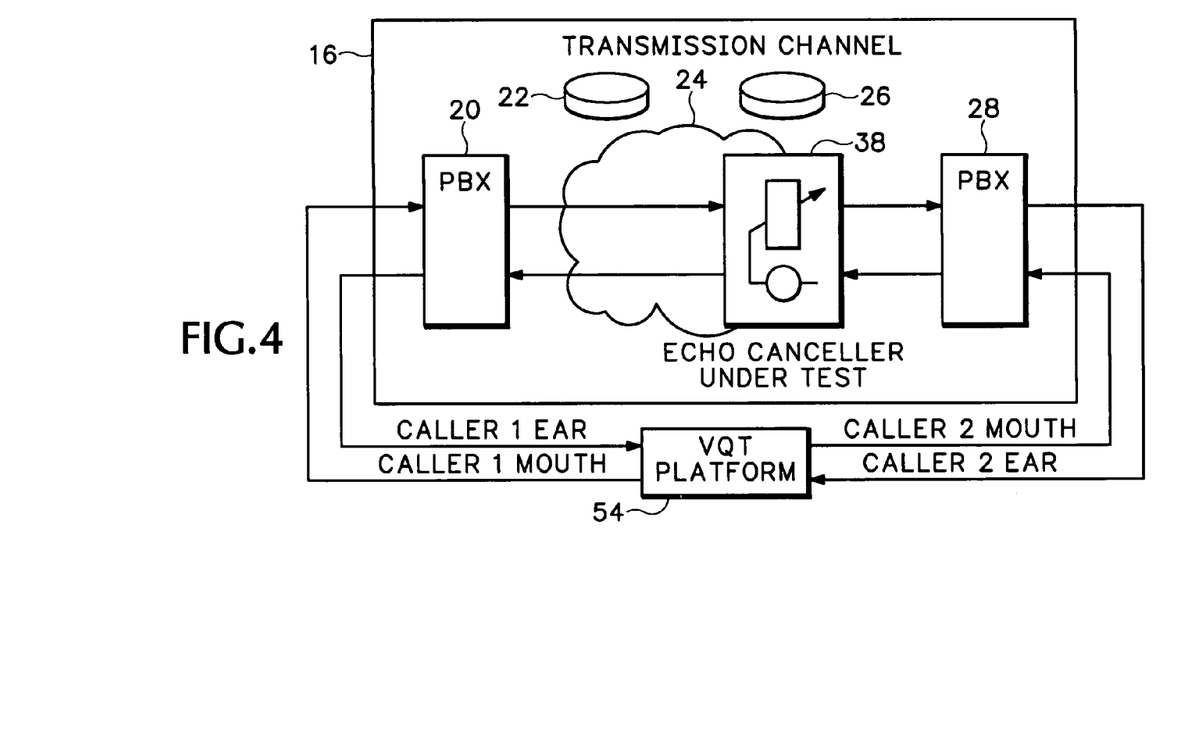
FIG. 4 is a diagram of a Voice Quality Test (VQT) platform according to the invention.

FIG. 4. is a schematic of a Voice Quality Test (VQT) platform 54 used for testing an echo canceller 38. The VQT platform 54, in one embodiment, is a Personal Computer (PC) with additional audio and signal processing hardware that allows telephone calls to be established, and audio signals to be generated and recorded across a network. The echo canceller 38 under test is located inside the transmission channel 16 between PBX 20 and PBX 28. The VQT platform 54 is connected to the transmission network via a 4-wire interface that may be Ear and Mouth (E&M), T1/E1, or packet-based (Ethernet). FIG. 4 shows an Ear and Mouth interface. The VQT platform 54 originates and terminates a call between the two telephony interfaces of the transmission network under test.

In FIG. 4, a left side interface of the VQT platform 54 is marked caller 1. The caller 1 interface goes 'off-hook' and dials up caller 2 on the right side interface of the VQT platform 54.

Caller 2 answers the call. Once the call has been established, audio signals flow between the caller 1 interface and the caller 2 interface. The VQT platform 54 controls the four signal nodes (caller 1&2, mouth and ear) which originate and terminate audio signals. The caller 1 interface and the caller 2 interface may reside on the same VQT platform 54, or on two separate VQT platforms.

Figure 5:
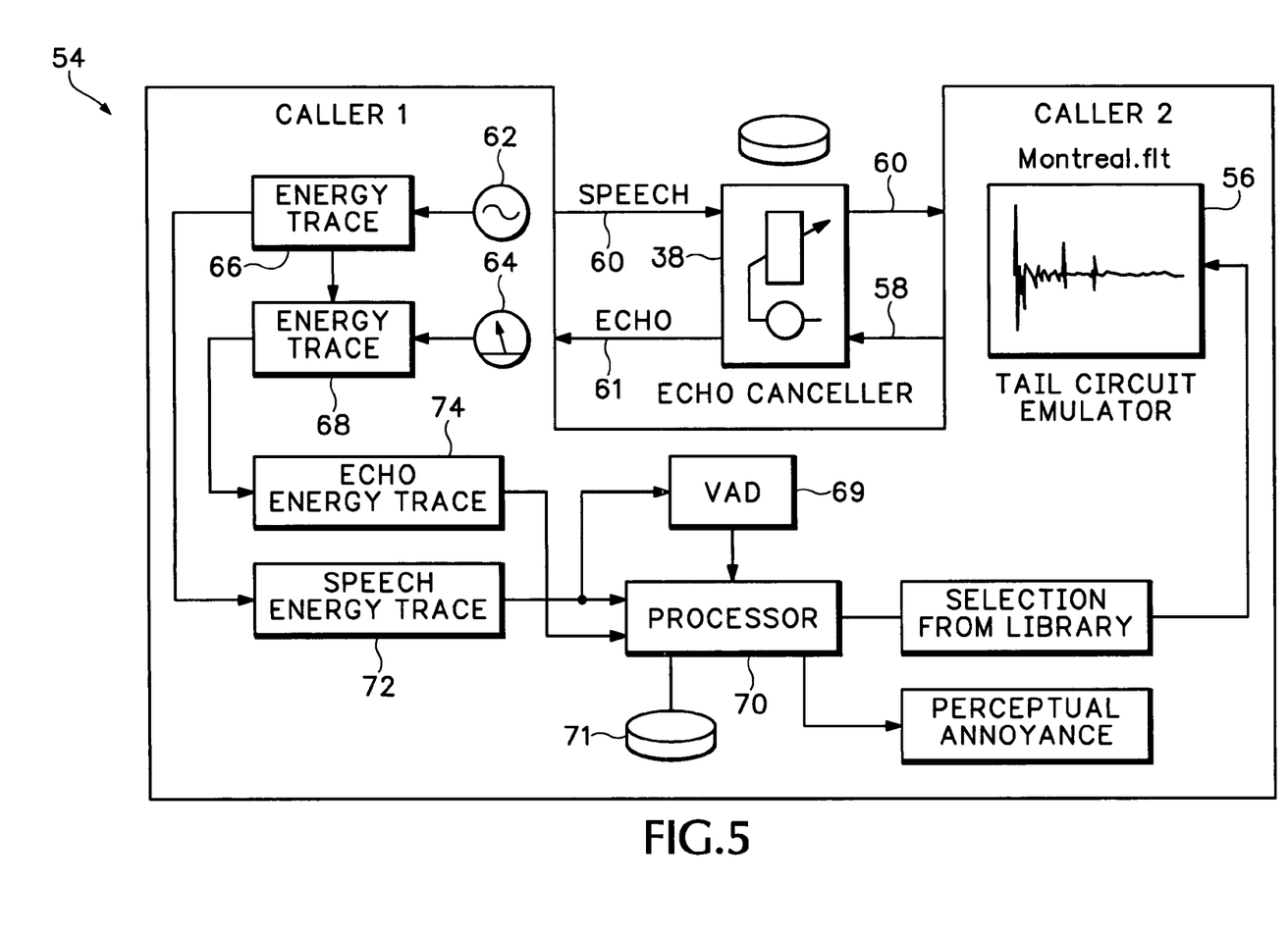
FIG. 5 is a detailed diagram of one embodiment of the VQT shown in FIG. 4.

FIG. 5 is a more detailed version of the VQT platform 54 shown in FIG. 4. The caller 1 side includes a speech signal generation node 62 and a recording node 64 for recording an echo signal 61. Energy trace blocks 66 and 68 monitor the short-term average energy of the digital audio signals of the prerecorded speech signal 60 and the returning echo signal 61, respectively. A speech energy trace 72 is output from energy trace block 66 and an echo energy trace 74 is output from energy trace block 68. The speech energy trace 72 and the echo energy trace 74 represent the energy envelopes for the speech signal 60 and echo signal 61, respectively, in decibels (dB). These traces 72 and 74 are shown in further detail below in FIG. 6. The speech energy trace 72 is input to a Voice Activity Detector (VAD) 69 and input along with the echo energy trace 74 to a signal processor 70 in the VQT platform 54.

The caller 2 side of the VQT platform 54 includes a tail-circuit emulator 56. The tail circuit emulator 56 emulates the input-output relationship seen if a phone call was actually placed to a real tail circuit, for example, in Montreal. A signal 58 emerging from the caller 2 mouth node is a superposition of several delayed and attenuated versions of the speech signal 60 entering at the caller 2 ear node.

The speech generation node 62, recording node 64, energy trace blocks 66 and 68, VAD 69, signal processor 70 and tail circuit emulator 56 are functional blocks that can be implemented in discrete hardware components or implemented with software within the same personal computer. The implementation of these functional blocks are known to those skilled in the art and are therefore are not described in further detail.

One key difference between the invention and the standard testing method shown in FIG. 3 is that the tail circuit emulator 56 uses an FIR filter. The coefficients for the FIR filter are obtained through impulse-response measurement of actual tail circuits. This provides more accurate tail-circuit emulation than obtainable through the N-reflector model used in ITU standards G.165 and G.168 (FIG. 3). The FIR filter in tail circuit emulator 56 is dynamically modified to provide desired Echo Return Loss (ERL, in dB) and initial delay by multiplying filter coefficients by a constant gain factor, or by adding zero coefficients at the beginning of the filter, respectively.

A library containing different sets of coefficients are used with the FIR filter. Each set of coefficients represents a different tail circuit location. Sets of FIR coefficients for various tail circuits are obtained directly through measurement of a particular tail circuit's impulse response. The coefficients are stored in a library 71 along with other sets of coefficients simulating tail circuits in other geographic locations. Measurement of impulse responses is a common technique known to those skilled in the arts and is therefore not described in further detail.

The processor 70 (FIG. 5) selects the set of coefficients that simulate a particular tail circuit used for testing the echo canceller 38. The selected coefficients are loaded into the FIR filter in the tail circuit emulator 56. The echo canceller 38 is then tested for the echo conditions associated with that particular tail circuit location. Another set of coefficients can then be loaded to the FIR filter and the echo canceller 38 performance tested again for a different tail circuit location.

Figure 6:
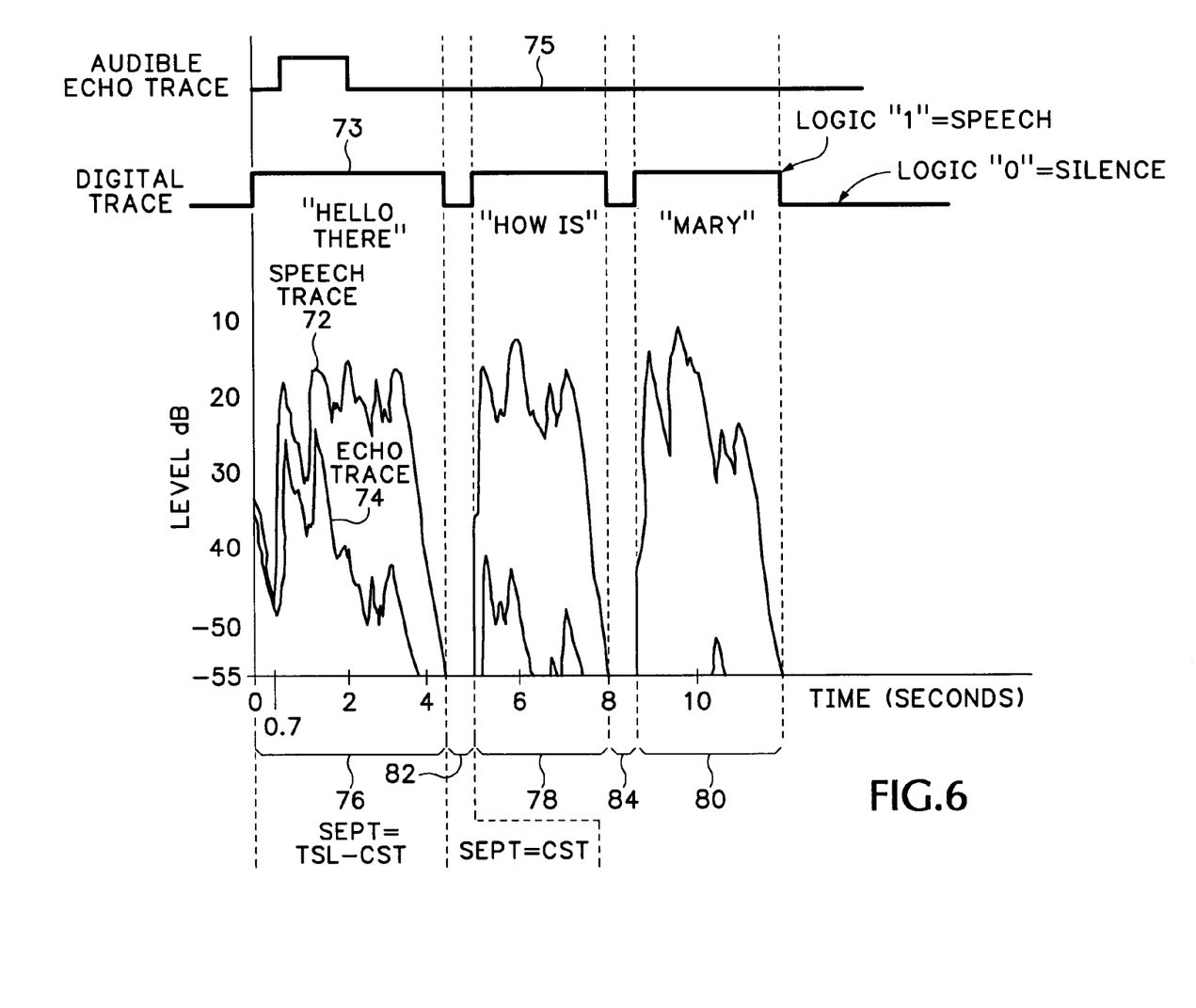
FIG. 6 shows echo and speech traces used to generated different speech metrics.

Referring to FIG. 5 and FIG. 6, example energy traces 72 and 74 are shown in FIG. 6 as output from the energy trace blocks 66 and 68 in FIG. 5. The speech trace 72 represents the speech energy level from speech signal 60. The echo trace 74 represents the echo energy level of the echo signal 61 allowed to pass through echo canceller 38 (FIG. 5). A digital trace 73 and an audible echo trace 75 are generated from the traces 72 and 74. The digital trace 73 is logic "1" during speech periods and is logic "0" during silence periods. The audible echo trace 75 is logic "1" when the echo is audible over the current speech. The echo canceller 38 under test quickly attenuates the echo trace 74 in the first few seconds of input speech 72 in a first speech episode 76. Over time, the echo canceller 38 converges further reducing the echo trace 74.

Once a call is established and connectivity is confirmed, a white noise signal is generated as the caller 1 mouth signal 60 (FIG. 5) while a zero or silence signal is generated at the caller 2 mouth node. This open-circuit emulation by the tail circuit emulator 56 trains the echo canceller 38 to adapt to an open tail circuit condition. This has the effect of setting the state of the echo canceller 38 to a zero initial condition. After this, the tail circuit FIR is introduced at the caller 2 end, and speech signals 60 are sent from the caller 1 mouth. The tail circuit emulator 56 generates an echo signal 58 according to the received signal 60. The echo signal 58 is sent back to the echo canceller 38. Speech and echo energy levels are recorded by recorder 64 for the duration of the test, and energy traces such as shown in FIG. 6 are derived.

Metrics of echo canceller performance are obtained from examination of the traces in FIG. 6, such as convergence time, echo attenuation, etc.

A key innovation of this invention is the addition of perceptual annoyance estimation of the speech traces 72, 73 and 74 and 75. Perceptual annoyance estimation uses two different models when rating echo canceller performance. A first model is used while a user is speaking. This is represented in FIG. 6 by the three speech episodes 76, 78 and 80. The speech episode 76, 78, and 80 are separated by silence episodes 82 and 84. In one example, the three speech episodes 76, 78 and 80 contain the speech segments "Hello There", "How is" and "Mary", respectively. The silence episodes 82 and 84 are the pauses that a speaker normally takes between phrases, sentences, etc.

During speech episodes 76, 78 and 80, a Speech Echo Perception Threshold (SEPT) is modeled as follows:

Speech Echo Perception Threshold ($dB$)= Talker Speech Level ($dB$)−Constant Speech Threshold ($dB$)         Equation 1

The Constant Speech Threshold is a user settable parameter, with a recommended value of about 20 dB. This SEPT model reflects the fact that during talker speech episodes, the speech signal will mask some audibility of the echo signal. The Speech Echo Perception Threshold in Equation 1 changes according to the current talker speech level. Put another way, the talker perceives echo only when the echo is about 20 dB down in level from the speech, or louder.

A second model is used during talker silence episodes. User perception of echo is much greater using silence episodes 82 and 84 (FIG. 6) because there is no speech signal to mask echo perception. In this case, a fixed constant for echo audibility is used as shown in Equation 2:

Silence Echo Perception Threshold ($dB$)=Constant Silence Threshold ($dB$).         Equation 2

The Constant Silence Threshold is a user settable constant value set in one recommended embodiment at −35 dB.

A constant defined as a No Echo Threshold is used both for speech and silence episodes. The echo signal is defined as audible only if it exceeds the No Echo Threshold, in addition to exceeding the current speech- or silence-echo perception threshold.

The echo signal is considered audible during a speech episode when:

Echo Signal>Speech Echo Perception Threshold>No Echo Threshold.

The echo signal is considered audible during a silence episode when:

Echo Signal>Silence Echo Perception Threshold>No Echo Threshold.         Equation 3

The determination of which threshold to use is based sample by sample on a talker signal speech/silence decision device. For example, the speech trace 72 and echo trace 74 in one example are sampled 8000 times per second. The speech energy trace 74 in FIG. 5 is fed into VAD 69 which then classifies the signal as speech or silence, sample by sample. The threshold in Equation 1 is used when the VAD 69 determines the sample occurs during a speech episode and Equation 2 is used when VAD 69 determines the sample occurs during a silence episode. VADs are known to those skilled in the art and are therefore not described in further detail. The echo signal for each sample is then identified as either audible or inaudible based on Equation 3.

Hence, an 'echo audibility' trace is generated that identifies an echo signal as audible or not audible to a listener based on sample by sample analysis of speech and echo energy level traces. Other metrics obtained from the trace include:

Number of speech and silence echo bursts. In one example, this is defined as periods of continuously audible echo in excess of 100 milliseconds (ms).

Average echo burst length (ms).

Total 'echo in speech' and 'echo in silence' duration's (ms).

Percentage echo-free speech= (total_speech_duration−total_echo_duration)/total_speech_duration.

The annoyance due to an echo of a given energy amplitude is an increasing function of the round-trip signal delay. In other words, the longer the delay in an echo signal, the more perceptually annoying the echo is to a listener. The annoyance metrics output from processor 98 identify the effects of long echo delays by comparing the reference speech 60 with the return echo signal 61 over many sample points. If the echo signal 61 has substantial delay, the delayed echo signal 61 may occur during a low energy point or in a silence episode in the reference signal 60. This echo delay is measured and used to calculate an echo annoyance weighting factor, with increasing delay resulting in increasing weight.

Audible echo analysis as described above is better than traditional echo canceller performance measurements where user perception of echo is not taken into account. The G.165 specification simply comes up with a single number to rate echo canceller performance. Conversely, the present invention can generate multiple metrics that provide more comprehensive analysis of echo canceller performance.

Perceptual Speech Quality Measure

Figure 7:
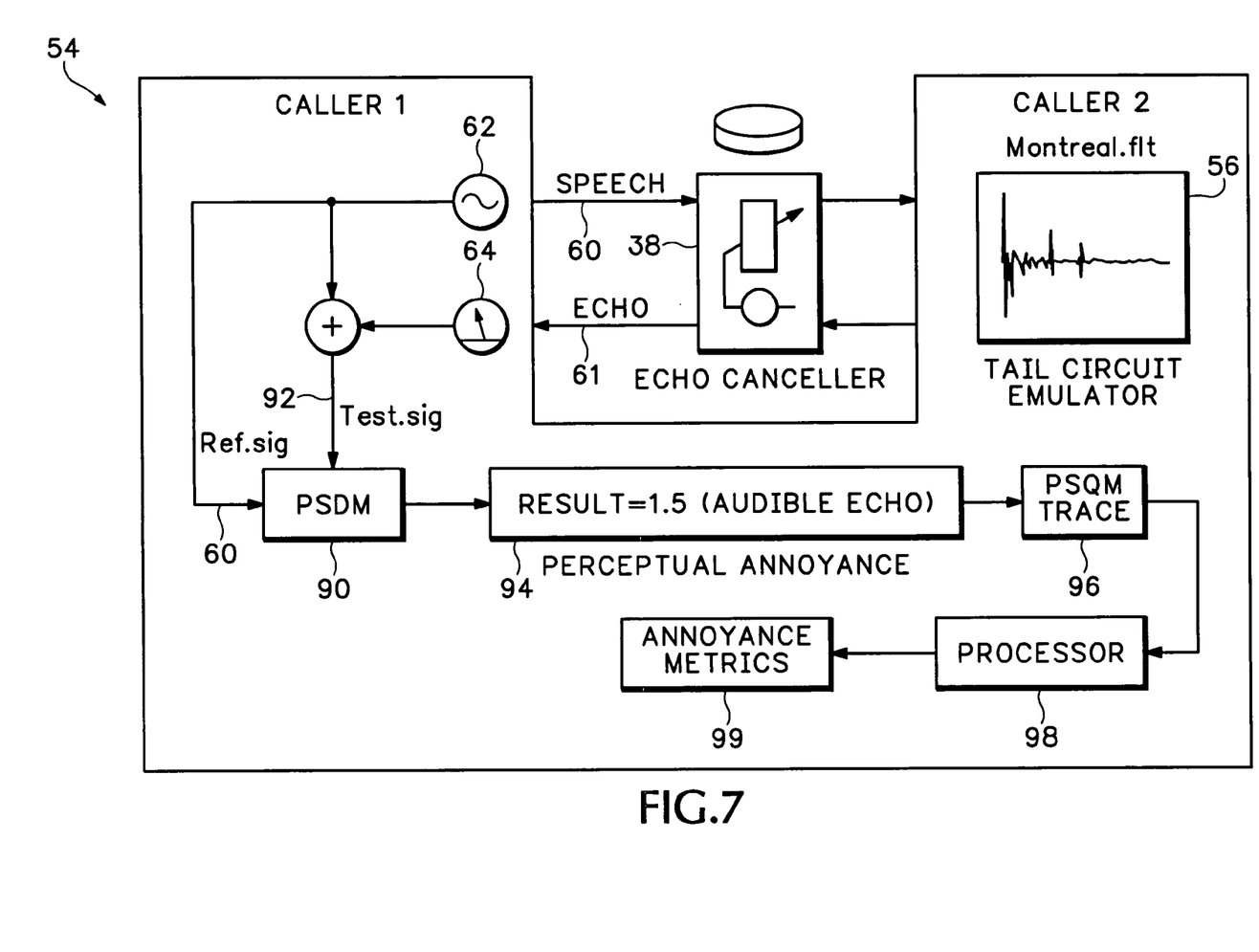
FIG. 7 shows another embodiment of the VQT platform that uses a Perceptual Speech Quality Measure to test perceptual annoyance in the echo canceller.

FIG. 7 shows another embodiment of the invention where user annoyance due to received echo is estimated using a Perceptual Speech Distortion Metric (PSDM) such as, but not limited to, ITU-P.861 (PSQM). PSDM algorithms are devices which estimate the perceptual distance between a reference (ref) speech signal and a presumably corrupted version (test) of this speech signal. They typically generate a number which is proportional to the audible degradation of the speech signal, a number which correlates well with results obtained from humans in listening test experiments, given the same speech samples. PSDMs might be considered as 'human listeners in a box', which yield opinions on 'how bad does the test speech signal sound compared to the ref speech signal'. The novel application of the PSDM (90) for measuring user annoyance due to echo provides a powerful, new metric for testing echo canceller performance.

The configuration in FIG. 7 shows how performance of the echo canceller 38 is measured for singletalk conditions. Singletalk conditions occur when there is no second independent speech signal output from the caller 2 side of the VQT platform 54. The PSDM 90 outputs a perceptual annoyance value 94. The PSDM 90 estimates the perceptual annoyance of listening to distorted speech caused when echo signal 61 leaks through echo canceller 38.

A test signal 92 is equal to the speech signal 60 plus the echo signal 61. If the echo signal 61 is zero, the reference signal (speech signal) 60 and the test signal 92 (speech+echo) are identical. The perceptual distance between reference signal 60 and test signal 92 output from PSDM 90 is zero when the echo signal 61 is zero. As the perceptual distance between reference signal 60 and test signal 92 increases, the PSDM outputs a larger perceptual annoyance value 94 representing a higher degree of user annoyance due to echo.

As previously described in FIG. 6, a trace of PSDM vs. time is generated by PSDM trace 96. From this trace, processor 98 measures the different annoyance metrics 99 associated with speech episodes and silence episodes, such as echo duration's, and percentage of echo-free speech.

Figure 8:
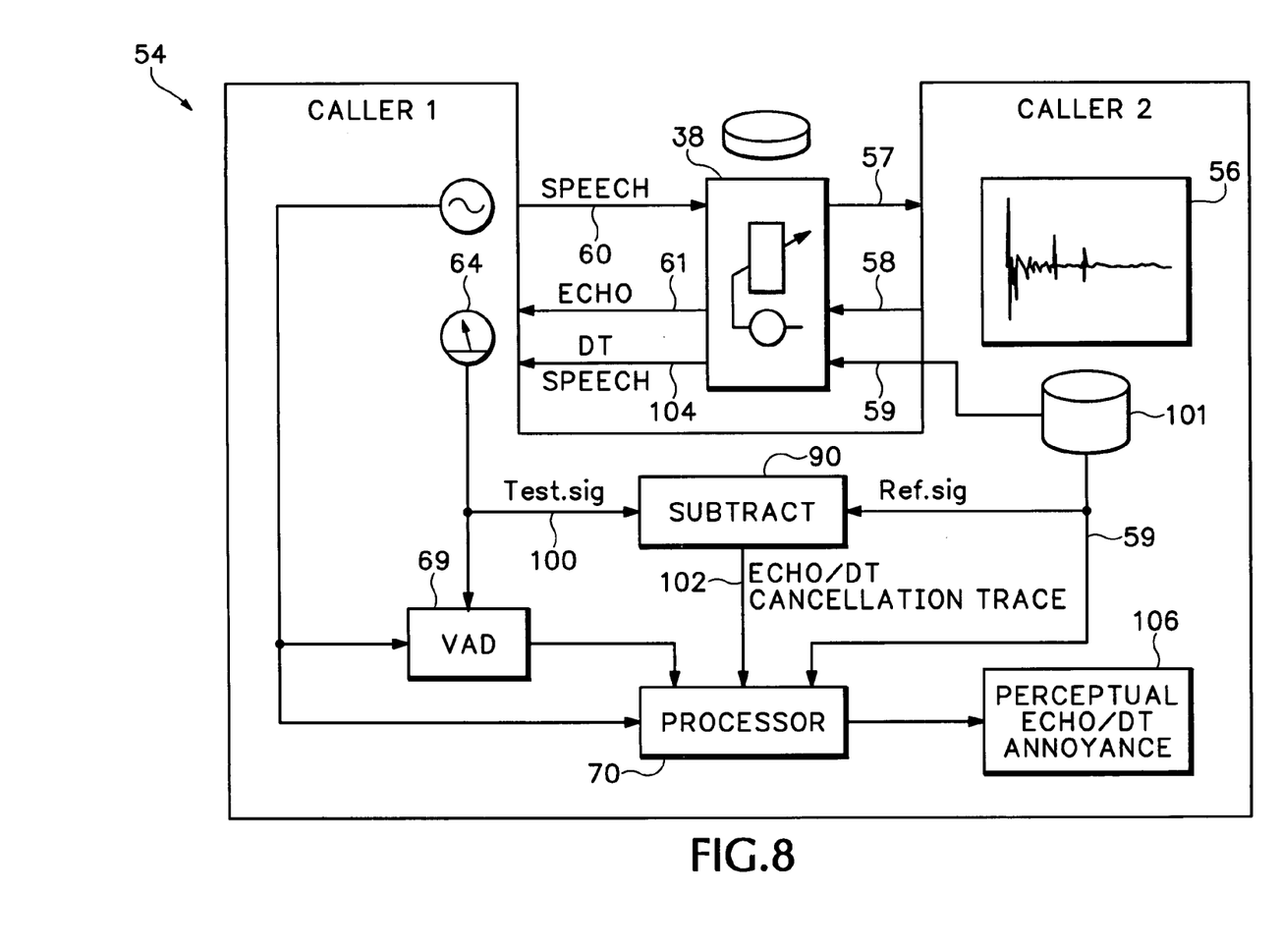
FIG. 8 is another embodiment of the VQT platform that tests the echo canceller during double talk.

FIG. 8 shows how the echo canceller 38 is tested for double-talk. A prerecorded speech signal 59 is generated from a recorder 101 at the same time the tail circuit emulator 56 generates an echo signal 58. In other words, the configuration in FIG. 8 simulates caller 1 and caller 2 at opposite ends of the phone call speaking at the same time. The signal recorded by recorder 64 returning to caller 1 no longer includes only an echo signal 61, but now includes the double talk signal 104 from caller 2.

There are two ways the echo canceller 38 may degrade the quality of the phone conversation due to double talk. The first is a loss of convergence when the coefficients of the echo canceller 38 diverge from an optimum value. This happens when convergence adaptation is not disabled when caller 2 is talking. The result is loss of performance (cancellation depth) during and immediately following a double talk episode.

Echo cancellers are designed to halt adaptation, or training, during double-talk episodes. An echo canceller can only converge (train correctly) when its input signal is purely echo. During a double-talk episode, the echo canceller's 38 input signal is the sum of echo signal 58 and double-talk speech signal 59. This would cause incorrect echo canceller adaptation, known as divergence, to occur if allowed. This divergence is manifested as poor cancellation and echo bursts in the return audio signal during and immediately following the double-talk episode.

The second audio degradation is caused when the echo canceller 38 allows excessive echo to leak through, or by chopping the caller 2 speech signal through excessive Non-Linear Processor (NLP) action. In this condition, the echo canceller 38 acts as an echo suppressor preventing some or all of the audio signal 59 from passing through to caller 1. The VQT platform 54 tests for this condition by comparing the caller 2 reference signal 59 with a test signal 100. The test signal 100 includes the double talk speech signal 104 and any echo signal 61.

If the caller 2 audio signal 59 is incorrectly suppressed by the echo canceller 38, the test signal 100 will not contain some part of the caller 2 reference signal 59. If the test signal 100 precisely matches the reference signal 59, the echo canceller 38 has removed all echo 61 generated by the tail circuit emulator 56 and has not suppressed any of double talk signal 59.

Alternatively, the echo canceller 38 does a poor job of removing echo signal 61 or suppresses part of the double talk signal 59. In this case, a strong echo signal 61 or a weak double talk signal 104 passes through the echo canceller 38 and the test signal 100 will not match the reference signal 59. The reference signal 59 is subtracted from the test signal 100 by subtractor 90 and the result output to processor 70. The subtraction is typically carried out in processor 70 but is shown in a separate block for illustrative purposes. The processor generates perceptual echo metrics 106 associated with double talk in a manner similar to that described above in FIG. 6.

Echo bursts immediately following double talk episode, are tested using energy traces. After call setup, the double-talk speech signal 59 is generated at the caller 2 mouth node, and the energy level trace of any echo signal 61 allowed to pass through echo canceller 38 is recorded by recorder 64 at the caller 1 ear node. This provides a template of the double-talk signal envelope. This trace is run through a VAD 69 to segment the double-talk signal into periods of speech and silence.

Figure 9:
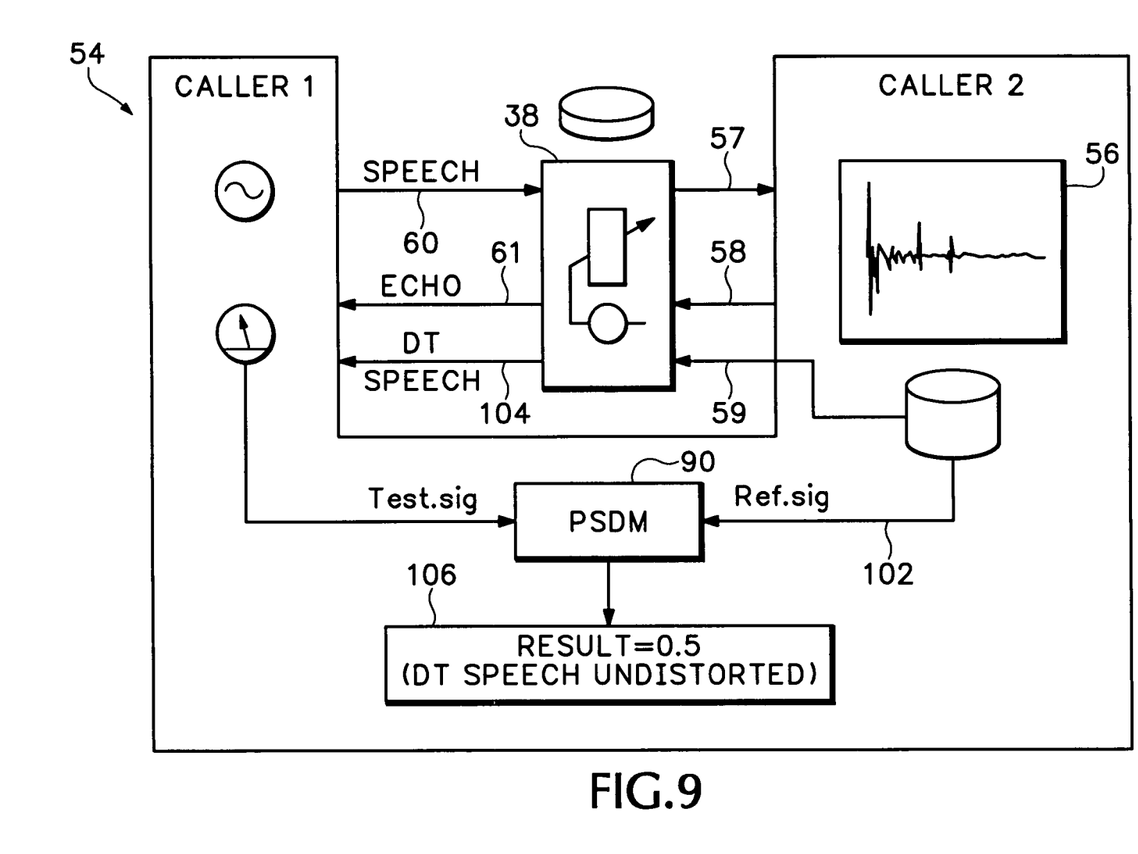
FIG. 9 another embodiment of the VQT platform that uses the Perceptual Speech Quality Measure to test the echo canceller during double talk.

After this, the standard PACE test is conducted in processor 70 as described above in FIG. 6. This time, the lower trace 74 in FIG. 6 represents the sum of echo and double-talk signal envelopes. The previously recorded double-talk template (reference signal) is subtracted from the test signal 100, leaving a 'purely echo' trace 102. This echo trace 102 is then analyzed to determine whether any audible echo bursts occurred within a short period, for example, 300 ms, of double-talk bursts. That is, within 300 ms of speech-to-silence transitions in the double-talk energy template. Any such echo bursts constitute failure of the device under test to halt adaptation during double-talk. Referring to FIG. 9, degradation of the transmitted double-talk signal is tested using a perceptual-distance measure algorithm. FIG. 9 represents a test configuration for determining whether the double-talk signal 59 is degraded by suppression by the echo canceller 38. Again, the echo canceller 38 is attempting to reduce the level of the echo signal 58 only, and should allow the double-talk signal 59 to pass through.

If the echo canceller 38 is working correctly, the double talk signal 104 arriving at the caller 1 ear node should be the same as the double-talk signal 59. Any clipping of the double-talk signal 59 or excessive leaking of echo signal 61 with the double talk signal 104 is perceived by caller 1 as distortion. The PSDM 90 estimates this perceptual distortion and outputs perceived distortion values 106.

The invention embodies a number of innovative enhancements to standard echo canceller measurement techniques. First, real speech excitation signals are used along with measured tail-circuit impulse responses that precisely emulate actual tail-circuit locations. Objective echo canceller performance measurements are augmented through estimation of the perceptual annoyance of echo on a human listener.

Perceived echo annoyance is estimated by segmenting the excitation signal energy trace into speech episodes and silence episodes. The episodes are analyzed using different echo-in-speech and echo-in-silence energy thresholds. Echo annoyance is alternatively estimated using a Perceptual Speech Distortion Metric such as PSQM. Echo bursts due to double-talk divergence are detected using energy traces and suppression of double-talk speech is estimated using the perceptual-distortion measure.

The invention can also be used for passive measurement of echo annoyance on live calls to an actual PSTN endpoint. Rather than calling up the 'other side' of the VQT 54 and performing tail circuit simulation, a call can be made to any telephone in any location. Testing as described above can then be conducted on the actual tail circuit at the location of the completed phone call.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A system for testing an echo canceller, comprising:
a speech generator outputting a real speech excitation signals to the echo canceller;
a tail circuit emulator generating echo signals back through the echo canceller in response to the real speech excitation signals, the tail circuit emulator including a library of selectable filter coefficients used for creating echo signals emulating different selectable tail-circuit locations; and
a processor comparing the real speech excitation signals with the echo signal for rating perceived echo annoyance.

2. A system for testing an echo canceller, comprising:
a speech generator outputting a speech or audio signal to the echo canceller;
a tail circuit emulator generating an echo back through the echo canceller in response to the speech signal; and
a processor rating perceived echo annoyance to a user for any received echo signal allowed to pass through the echo canceller, wherein the processor uses a speech echo perception threshold to rate the perceived echo annoyance when the received echo signal occurs during speech episodes in the speech signal and uses a silence echo perception threshold to rate the perceived echo annoyance when the received echo signal occurs during silent episodes in the speech signal.

3. A system according to claim 2 wherein the speech echo perception threshold is based on a talker speech level and a constant speech threshold and the silence echo perception threshold is based only on the constant speech threshold.

4. A system according to claim 3 wherein the echo signal is indicated as audible only when the received echo signal is greater than the speech echo perception threshold or the silence echo perception threshold and also greater than a no echo threshold.

5. A system for testing an echo canceller, comprising:
a processor receiving a first signal representing a speech or audio signal and a second signal representing a received echo signal allowed to pass through an echo canceller, the processor comparing the first signal with the second signal to generate a perceptual echo annoyance metric according to a number of echo bursts in the echo signal associated with speech episodes and a number of echo bursts associated with silence episodes in the speech or audio signal, the processor using a first active speech threshold to determine the annoyance metric for the speech episodes and using a second silence threshold to determine the annoyance metric for the silence episodes.

6. A system for testing an echo canceller, comprising:
a speech generator outputting a speech or audio signal to the echo canceller;
a tail circuit emulator generating an echo back through the echo canceller in response to the speech signal;
a processor rating perceived echo annoyance to a user for any received echo signal allowed to pass through the echo canceller; and
a first energy trace outputting a trace of the speech or audio signal and a second energy trace outputting a trace of the received echo signal allowed to pass through the echo canceller, the processor generating different perceptual echo annoyance metrics by comparing the speech trace with the echo trace at multiple sample points;
wherein the echo annoyance metrics include any one of the following;
a number of echo bursts associated with speech episodes and silence episodes;
an average time for the echo bursts;
a total duration of the received echo signal during the speech episodes and a total duration of the received echo signal during the silence episodes; and
a ratio of echo-free speech in the speech or audio signal.

7. A system for testing an echo canceller, comprising:
a speech generator outputting speech signals to the echo canceller;
a voice activity detector coupled to the speech generator for identifying speech episodes and silent episodes in the speech signal;
a tail circuit emulator generating an echo back signal through the echo canceller in response to the excitation signals; and
a processor comparing the speech signals with the echo back signal and varying criteria for rating perceived echo annoyance according to the identified speech and silent episodes in the speech signals.

8. A system for testing an echo canceller, comprising:
a processor rating perceived echo annoyance to a user for a received echo signal allowed to pass through an echo canceller and
adding a speech signal and the received echo signal to generate a test signal and comparing the test signal with the speech signal to identify the perceived echo annoyance, the processor using a first threshold for rating the perceived echo annoyance during detected speech periods in the speech signal and using a different second threshold for rating the perceived echo annoyance during detected silence periods in the speech signal.

9. A system for testing an echo canceller, comprising:
a speech generator outputting a speech or audio signal to the echo canceller;
a tail circuit emulator generating an echo back through the echo canceller in response to the speech signal; and
a processor rating perceived echo annoyance to a user for any received echo signal allowed to pass through the echo canceller;
wherein the tail circuit includes an Finite Impulse Response (FIR) filter and a library of FIR coefficients, each set of FIR coefficients selectable for use with the FIR filter to emulate different selectable tail circuit locations.

10. A system for testing an echo canceller, comprising:
a speech generator outputting a speech or audio signal to the echo canceller;
a tail circuit emulator generating an echo back through the echo canceller in response to the speech signal;
a processor rating perceived echo annoyance to a user for any received echo signal allowed to pass through the echo canceller; and
a second speech generator generating a double talk signal from a tail circuit emulator side of the echo canceller.

11. A system according to claim 10 wherein the processor generates a difference signal by subtracting the double talk signal output from the second signal generator from the received echo signal and the received double talk signal that passes through the echo canceller, the processor comparing the difference signal with the speech or audio signal to determine the perceptual echo annoyance and double talk suppression caused by the echo canceller.

12. A system according to claim 11 including a voice activity detector for identifying speech episodes and silence episodes in the speech or audio signal and the double talk signal.

13. A system according to claim 10 wherein the processor uses a Perceptual Speech Quality Measure to generate the perceived echo annoyance caused by suppression of the double talk signal by the echo canceller.

14. A system according to claim 13 wherein the a Perceptual Speech Quality Measure is implemented according to the ITU-T P.861 standard.

15. A method for testing an echo canceller, comprising:
outputting a speech signal to the echo canceller;
receiving an echo signal passing through the echo canceller;
determining a speech duration in the speech signal;
determining an echo duration in the echo signal;
comparing the echo duration in the echo signal with the speech duration in the speech signal to determine a percentage of echo-free speech in the speech signal; and
rating a perceptual echo annoyance for the echo signal passing through the echo canceller according to the percentage of echo-free speech.

16. A method for testing an echo canceller, comprising:
outputting a speech signal to the echo canceller;
generating an echo signal back through the echo canceller in response to the speech signal;
receiving any echo signal passing through the echo canceller;
rating a perceptual echo annoyance for any of the received echo signal passing through the echo canceller; and
using a first speech echo perception threshold to determine the perceptual echo annoyance when the echo occurs during speech episodes in the speech signal and using a second silence echo perception threshold to determine the perceptual echo annoyance when the echo occurs during silent episodes in the speech signal.

17. A method for testing an echo canceller, comprising:
outputting a speech signal to the echo canceller;
generating an echo signal back through the echo canceller in response to the speech signal;
receiving any echo signal passing through the echo canceller;
rating a perceptual echo annoyance for any of the received echo signal passing through the echo canceller; and
generating the speech echo perception threshold according to a talker speech level and a constant speech threshold and the silence echo perception threshold is generated according to the constant speech threshold.

18. A method according to claim 17 including indicating the perceptual echo annoyance is audible only when the received echo signal is greater than the speech or silence echo perception threshold and the speech or silence echo perception threshold is greater than a no echo threshold.

19. A method for testing an echo canceller, comprising:
outputting a speech signal to the echo canceller;
receiving any echo signal passing through the echo canceller;
identifying talking periods and silence periods in the speech signal; and
comparing the speech signal with the echo signal and using a first active speech threshold for rating perceived echo annoyance for the identified talking periods and using a second different silence threshold for rating perceived echo annoyance for silent periods in the speech signals.

20. A method for testing an echo canceller, comprising:
outputting a speech signal to the echo canceller;
generating an echo signal back through the echo canceller in response to the speech signal;
receiving any echo signal passing through the echo canceller;
rating a perceptual echo annoyance for any of the received echo signal passing through the echo canceller;
generating a first energy trace from the speech signal;
generating a second energy trace from the received echo signal; and
generating different perceptual echo annoyance metrics identifying different aspects of perceptual echo annoyance by comparing the first energy trace with the second energy trace at different sample points;
wherein generating the echo annoyance metrics include any one of the following steps;
detecting a number of echo bursts according to a number of speech episodes and silence episodes;
detecting a duration of the echo bursts;
detecting a total duration of the received echo signal during speech episodes and a total duration of the received echo signal during silence episodes; and
deriving a ratio of echo-free speech in the speech signal.

21. A method for testing an echo canceller, comprising:
outputting a speech signal to the echo canceller;
generating an echo signal back through the echo canceller in response to the speech signal;
receiving any echo signal passing through the echo canceller;

rating a perceptual echo annoyance for any of the received echo signal passing through the echo canceller; and identifying when speech episodes and silence episodes happen in the speech signal by using a voice activity detector and then determining the perceptual echo annoyance according to whether the received echo signal occurs during the speech episodes or the silence episodes.

22. A method for testing an echo canceller, comprising:
outputting a speech signal to the echo canceller;
generating an echo signal back through the echo canceller in response to the speech signal;
receiving any echo signal passing through the echo canceller;
rating a perceptual echo annoyance for any of the received echo signal passing through the echo canceller; and
adding the speech signal and the received echo signal together to generate a test signal and comparing the test signal with the speech signal using a Perceptual Speech Distortion Metric (PSDM) to that generates numbers proportional to an audible degradation of the speech signal correlated with results obtained from humans in listening tests given with the same speech signal.

23. A method for testing an echo canceller, comprising:
outputting a speech signal to the echo canceller;
generating an echo signal back through the echo canceller in response to the speech signal;
receiving any echo signal passing through the echo canceller;
rating a perceptual echo annoyance for any of the received echo signal passing through the echo canceller;
generating a library of filter coefficients that emulate different echo signals for different tail circuit locations;
emulating echo signals for the different tail circuit locations according to the speech signal and sending the emulated echo signals to the echo canceller; and
rating the perceptual echo annoyance for the different emulated echo signals.

24. A method for testing an echo canceller, comprising:
outputting a speech signal to the echo canceller;
generating an echo signal back through the echo canceller in response to the speech signal;
receiving any echo signal passing through the echo canceller;
rating a perceptual echo annoyance for any of the received echo signal passing through the echo canceller; and
sending a double talk signal along with the echo signal back to the echo canceller.

25. A method according to claim 24 including subtracting the double talk signal from a recorded double talk signal and a recorded echo signal passing through the echo canceller to generate a distortion signal.

26. A method according to claim 25 including deriving energy metrics rating the echo canceller by comparing the distortion signal with the speech signal.

27. A system for testing an echo canceller, comprising:
means for outputting a speech signal to the echo canceller;
means for receiving an echo signal passing through the echo canceller;
means for determining a speech duration in the speech signal;
means for determining an echo duration in the echo signal;
means for comparing the echo duration in the echo signal with the speech duration in the speech signal to determine a percentage of echo-free speech in the speech signal; and means for rating a perceptual echo annoyance for the echo signal passing through the echo canceller according to the percentage of echo-free speech.

28. A system for testing an echo canceller, comprising:
means for outputting a speech signal to the echo canceller;
means for generating an echo signal back through the echo canceller in response to the speech signal;
means for receiving any echo signal passing through the echo canceller;
means for adding the speech signal and the received echo signal together to generate a test signal;
means for comparing the test signal with the speech signal;
means for rating a perceptual echo annoyance for the echo signal passing through the echo canceller according to the comparison between the test signal and the speech signal; and
means for using a first speech echo perception threshold to determine the perceptual echo annoyance when the echo occurs during speech episodes in the speech signal and using a second silence echo perception threshold to determine the perceptual echo annoyance when the echo occurs during silent episodes in the speech signal.

29. A system according to claim 28 including means for generating the speech echo perception threshold according to a talker speech level and a constant speech threshold and means for generating the silence echo perception threshold according to the constant speech threshold.

30. A system according to claim 29 including means for including the perceptual echo annoyance as audible only when the received echo signal is greater than the speech or silence echo perception threshold and the speech or silence echo perception threshold is greater than a no echo threshold.

31. A system according to claim 27 including:
means for generating a first energy trace from the speech signal;
means for generating a second energy trace from the received echo signal; and
means for generating different perceptual echo annoyance metrics identifying different aspects of perceptual echo annoyance by comparing the first energy trace with the second energy trace at different sample points.

32. A system for testing an echo canceller, comprising:
means for outputting a speech signal to the echo canceller;
means for generating an echo signal back through the echo canceller in response to the speech signal;
means for receiving any echo signal passing through the echo canceller;
means for adding the speech signal and the received echo signal together to generate a test signal;
means for comparing the test signal with the speech signal;
means for rating a perceptual echo annoyance for the echo signal passing through the echo canceller according to the comparison between the test signal and the speech signal;
means for generating a first energy trace from the speech signal;
means for generating a second energy trace from the received echo signal;
means for generating different perceptual echo annoyance metrics identifying different aspects of perceptual echo annoyance by comparing the first energy trace with the second energy trace at different sample points;
means for detecting a number of echo bursts according to a number of speech episodes and silence episodes;

means for detecting a duration of the echo bursts;
means for detecting a total duration of the received echo signal during speech episodes and a total duration of the received echo signal during silence episodes; and
means for deriving a ratio of echo-free speech in the speech signal.

33. A system for testing an echo canceller, comprising:
means for outputting a speech signal to the echo canceller;
means for generating an echo signal back through the echo canceller in response to the speech signal;
means for receiving any echo signal passing through the echo canceller;
means for adding the speech signal and the received echo signal together to generate a test signal;
means for comparing the test signal with the speech signal;
means for rating a perceptual echo annoyance for the echo signal passing through the echo canceller according to the comparison between the test signal and the speech signal; and
means for identifying when speech episodes and silence episodes happen in the speech signal by using a voice activity detector and then determining the perceptual echo annoyance according to whether the received echo signal occurs during the speech episodes or the silence episodes.

34. A system according to claim 27 including means for adding the speech signal and the received echo signal together to generate a test signal and comparing the test signal with the speech signal using a Perceptual Speech Distortion Metric (PSDM) to identify the perceived echo annoyance.

35. A system for testing an echo canceller, comprising:
means for outputting a speech signal to the echo canceller;
means for generating an echo signal back through the echo canceller in response to the speech signal;
means for receiving any echo signal passing through the echo canceller;
means for adding the speech signal and the received echo signal together to generate a test signal;
means for comparing the test signal with the speech signal;
means for rating a perceptual echo annoyance for the echo signal passing through the echo canceller according to the comparison between the test signal and the speech signal;
means for generating a library of filter coefficients that emulate different echo signals for different tail circuit locations;
means for emulating echo signals for the different tail circuit locations according to the speech signal and sending the emulated echo signals to the echo canceller; and
means for rating the perceptual echo annoyance for the different emulated echo signals.

36. A system for testing an echo canceller, comprising:
means for outputting a speech signal to the echo canceller;
means for generating an echo signal back through the echo canceller in response to the speech signal;
means for receiving any echo signal passing through the echo canceller;
means for adding the speech signal and the received echo signal together to generate a test signal;
means for comparing the test signal with the speech signal;
means for rating a perceptual echo annoyance for the echo signal passing through the echo canceller according to the comparison between the test signal and the speech signal; and
means for sending a double talk signal along with the echo signal back to the echo canceller.

37. A system according to claim 36 including means for subtracting the double talk signal from a recorded double talk signal and a recorded echo signal passing through the echo canceller to generate a distortion signal.

38. A system according to claim 37 including means for deriving energy metrics rating the echo canceller by comparing the distortion signal with the speech signal.

39. A computer readable medium including instructions for testing an echo canceller, the instructions when executed perform the following:
outputting a speech signal to the echo canceller;
receiving an echo signal passing through the echo canceller;
adding the speech signal and the received echo signal together to generate a test signal;
comparing the test signal with the speech signal; and
rating a perceptual echo annoyance for the echo signal passing through the echo canceller according to the comparison between the signal and the speech signal by distinguishing talking periods from silence periods in the speech signal and varying criteria used for rating perceived echo annoyance for the talking periods and silent periods in the speech signal.

40. A computer readable medium including instructions for testing an echo canceller, the instructions when executed perform the following:
outputting a speech signal to the echo canceller;
generating an echo signal back through the echo canceller in response to the speech signal;
receiving any echo signal passing through the echo canceller;
adding the speech signal and the received echo signal together to generate a test signal;
comparing the test signal with the speech signal; and
rating a perceptual echo annoyance for the echo signal passing through the echo canceller according to the comparison between the test signal and the speech signal; and
using a first speech echo perception threshold to determine the perceptual echo annoyance when the echo occurs during speech episodes in the speech signal and using a second silence echo perception threshold to determine the perceptual echo annoyance when the echo occurs during silent episodes in the speech signal.

41. A computer readable medium according to claim 40 wherein the speech echo perception threshold is generated according to a talker speech level and a constant speech threshold and the silence echo perception threshold is generated according to the constant speech threshold.

42. A computer readable medium according to claim 41 including indicating the perceptual echo annoyance is audible only when the received echo signal is greater than the speech or silence echo perception threshold and the speech or silence echo perception threshold is greater than a no echo threshold.

43. A computer readable median according to claim 39 including:
generating a fist energy trace from the speech signal;
generating a second energy trace from the received echo signal; and generating different perceptual echo annoyance metrics identifying different aspects of perceptual echo annoyance by comparing the first energy trace with the second energy trace at different sample points.

44. A computer readable medium including instructions for testing an echo canceller, the instructions when executed perform the following:
- outputting a speech signal to the echo canceller;
- generating an echo signal back through the echo canceller in response to the speech signal;
- receiving any echo signal passing through the echo canceller;
- adding the speech signal and the received echo signal together to generate a test signal;
- comparing the test signal with the speech signal;
- rating a perceptual echo annoyance for the echo signal passing through the echo canceller according to the comparison between the test signal and the speech signal;
- generating a first energy trace from the speech signal;
- generating a second energy trace from the received echo signal; and
generating different perceptual echo annoyance metrics identifying different aspects of perceptual echo annoyance by comparing the first energy trace with the second energy trace at different sample points, wherein generating the echo annoyance metrics include any one of the following:
- detecting a number of echo bursts according to a number of speech episodes and silence episodes;
- detecting a duration of the echo bursts;
- detecting a total duration of the received echo signal during speech episodes and a total duration of the received echo signal during silence episodes; and
- deriving a ratio of echo-free speech in the speech signal.

45. A computer readable medium including instructions for testing an echo canceller, the instructions when executed perform the following:
- outputting a speech signal to the echo canceller;
- generating an echo signal back through the echo canceller in response to the speech signal;
- receiving any echo signal passing through the echo canceller;
- adding the speech signal and the received echo signal together to generate a test signal;
- comparing the test signal with the speech signal;
- rating a perceptual echo annoyance for the echo signal passing through the echo canceller according to the comparison between the test signal and the speech signal; and
- identifying when speech episodes and silence episodes happen in the speech signal by using a voice activity detector and then determining the perceptual echo annoyance according to whether the received echo signal occurs during the speech episodes or the silence episodes.

46. A computer readable medium according to claim 39 including comparing the test signal with the speech signal using a Perceptual Speech Distortion Metric (PSDM) to identify the perceived echo annoyance that generates numbers proportional to an audible degradation of the speech signal and that correlate with results obtained from humans in listening tests given with the same speech signal.

47. A computer readable medium including instructions for testing an echo canceller, the instructions when executed perform the following:
- outputting a speech signal to the echo canceller;
- generating an echo signal back through the echo canceller in response to the speech signal;
- receiving any echo signal passing through the echo canceller;
- adding the speech signal and the received echo signal together to generate a test signal;
- comparing the test signal with the speech signal;
- rating a perceptual echo annoyance for the echo signal passing through the echo canceller according to the comparison between the test signal and the speech signal;
- generating a library of filter coefficients that emulate different echo signals for different tail circuit locations;
- emulating echo signals for the different tail circuit locations according to the speech signal and sending the emulated echo signals to the echo canceller; and
- rating the perceptual echo annoyance for the different emulated echo signals.

48. A computer readable medium including instructions for testing an echo canceller, the instructions when executed perform the following:
- outputting a speech signal to the echo canceller;
- generating an echo signal back through the echo canceller in response to the speech signal;
- receiving any echo signal passing through the echo canceller;
- adding the speech signal and the received echo signal together to generate a test signal;
- comparing the test signal with the speech signal;
- rating a perceptual echo annoyance for the echo signal passing through the echo canceller according to the comparison between the test signal and the speech signal; and
- sending a double talk signal along with the echo signal back to the echo canceller.

49. A computer readable medium according to claim 48 including subtracting the double talk signal from a recorded double talk signal and a recorded echo signal passing through the echo canceller to generate a distortion signal.

50. A computer readable medium according to claim 49 including deriving energy metrics rating the echo canceller by comparing the distortion signal with the speech signal.

* * * * *